US012696840B2

(12) United States Patent
Bußmann et al.

(10) Patent No.: US 12,696,840 B2
(45) Date of Patent: Aug. 4, 2026

(54) COMBINE HARVESTER AND THRESHING DRUM FOR A THRESHING DEVICE OF A COMBINE HARVESTER

(71) Applicant: CLAAS Selbstfahrende Erntemaschinen GmbH, Harsewinkel (DE)

(72) Inventors: Jens Bußmann, Ostercappeln (DE); Bernd Holtmann, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 359 days.

(21) Appl. No.: 18/367,616

(22) Filed: Sep. 13, 2023

(65) Prior Publication Data

US 2024/0081182 A1      Mar. 14, 2024

(30) Foreign Application Priority Data

Sep. 13, 2022    (DE) ..................... 10 2022 123 307.3

(51) Int. Cl.
　　 *A01D 41/02*　　(2006.01)
　　 *A01F 12/26*　　(2006.01)
　　 *A01F 12/44*　　(2006.01)
(52) U.S. Cl.
　　 CPC .............. *A01D 41/02* (2013.01); *A01F 12/26* (2013.01); *A01F 12/44* (2013.01)
(58) Field of Classification Search
　　 CPC ......... A01D 41/02; A01D 41/12; A01F 12/26; A01F 12/44; A01F 12/40; A01F 7/04
　　 See application file for complete search history.

(56) References Cited

U.S. PATENT DOCUMENTS 1,853,784 A * 4/1932 Stevens ................... A01F 12/20
　　　　　　　　　　　　　　　　　　　　　　460/71
2,266,806 A * 12/1941 Ronning ................. A01F 12/20
　　　　　　　　　　　　　　　　　　　　　　460/71

(Continued)

FOREIGN PATENT DOCUMENTS

DE　　　　　946098 C　　7/1956
DE　　　　　950249 C　　10/1956

(Continued)

OTHER PUBLICATIONS

European Search Report for EP Application No. 23186577.5-1105 mailed Feb. 12, 2024.

*Primary Examiner* — Arpad Fabian-Kovacs
(74) *Attorney, Agent, or Firm* — Lempia Summerfield Katz LLC

(57)　　　　　　ABSTRACT

The threshing drum comprising a drum body and beater bars. The beater bars each have a beating edge which describes a circumferential circle about a center axis of the drum body, on which the particular beating edge rotates about the center axis in a beating radius during operation of the threshing drum. To improve a flow of harvested material while the flow is being transferred from a threshing device to a downstream separating device, a cutting ring is positioned centrally on the drum body, viewed in the longitudinal direction of the drum body, which rotates in the circumferential direction of the drum body. The cutting ring has at least one circumferential cutting edge which describes a circumferential circle whose cutting radius, measured with respect to the center axis, is greater than the beating radii of the beating edges.

20 Claims, 8 Drawing Sheets

(56)                    References Cited

U.S. PATENT DOCUMENTS

| | | | |
|---|---|---|---|
| 5,454,758 A | 10/1995 | Tophinke et al. | |
| 8,231,447 B2 | 7/2012 | Buehlmeier | |
| 9,043,959 B2 * | 6/2015 | Esken | A01F 12/10 |
| 10,091,941 B2 * | 10/2018 | Bojsen | A01F 7/04 |
| 10,440,892 B2 * | 10/2019 | Verhoeven | A01F 12/446 |
| 11,266,072 B2 * | 3/2022 | Singh | A01F 7/02 |
| 2001/0054279 A1 | 12/2001 | Schwersmann | |
| 2012/0100898 A1 * | 4/2012 | Mygind | A01F 7/067 |
| | | | 460/22 |
| 2014/0194170 A1 | 7/2014 | Holtmann et al. | |
| 2016/0007536 A1 | 1/2016 | Bussmann | |
| 2020/0305352 A1 | 10/2020 | Bussmann et al. | |
| 2023/0172105 A1 | 6/2023 | Brune | |

FOREIGN PATENT DOCUMENTS

| | | | |
|---|---|---|---|
| DE | 3417929 C2 * | 2/1994 | A01F 12/442 |
| DE | 102004004495 A1 * | 9/2005 | A01F 12/00 |
| DE | 102014109702 A1 * | 1/2016 | A01D 41/12 |
| EP | 1147701 A1 | 10/2001 | |
| EP | 2965614 A1 | 1/2016 | |
| EP | 3031316 A1 * | 6/2016 | A01F 7/067 |
| EP | 3782454 A1 * | 2/2021 | A01F 12/10 |
| EP | 3501258 B1 * | 8/2022 | A01F 12/24 |
| EP | 4230024 A1 * | 8/2023 | A01F 7/06 |
| WO | WO-9610327 A1 * | 4/1996 | A01F 12/185 |
| WO | WO-2009001216 A2 * | 12/2008 | A01F 7/06 |

* cited by examiner

Prior Art

COMBINE HARVESTER AND THRESHING DRUM FOR A THRESHING DEVICE OF A COMBINE HARVESTER

CROSS REFERENCE TO RELATED APPLICATION

This application claims priority under 35 U.S.C. § 119 to German Patent Application No. DE 10 2022 123 307.3 filed Sep. 13, 2022, the entire disclosure of which is hereby incorporated by reference herein.

TECHNICAL FIELD

The present application relates to a threshing drum for a threshing device of a combine harvester and a self-propelled combine harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A combine harvester may be configured to harvest plants in on a field, whereby the plants may be processed, inter alia, using a threshing device. One example threshing device is a tangential threshing device, which may comprise a tangential front drum and a tangential threshing drum arranged or positioned downstream from the front drum in the direction of flow of a flow of harvested material. Furthermore, the threshing device may comprise a threshing concave which surrounds both the front drum and the threshing drum at least partly. In the course of processing the particular harvested material, the latter is guided in a threshing gap between the front drum and the threshing concave, or between the threshing drum and the threshing concave, and processed in such a way that crop of the harvested material is detached from remaining plant residues of the harvested material. A majority of the crop may be directly separated from the plant or crop residues using the threshing concave. The threshing concave may be movable relative to the threshing drum so that a threshing gap located between the threshing drum and the threshing concave is variable. The change in a thickness of the threshing gap is typically executed depending on prevailing boundary conditions, such as moisture of the harvested material and harvested material throughput, in order to optimize the threshing result.

The threshing drum of the threshing device may comprise a cylindrical drum body rotatably drivable about its center axis and a plurality of beater bars that are arranged or positioned on an outer circumferential surface of the drum body. The beater bars may each have a beating edge oriented parallel to the center axis of the drum body. Accordingly, the beater bars may extend parallel to the center axis along the drum body, whereby the beater bars may extend over an entire length of the drum body. In operation, the beater bars may come into contact with the harvested material and exert beating energy on the harvested material so that the crop is "threshed out", which may separate the crop from the plant or crop residues. So that the beater bars or, more specifically, their beating edges may enter into the described engagement with the harvested material, the beater bars in each case may project in a radial direction with respect to the center axis of the drum body in a direction away from the center axis beyond the outer circumferential surface of the drum body. The radially outer beating edges of the beater bars may describe or define a circumferential circle around the center axis, on which they move while the threshing drum is rotatably driven. The circumferential circle of the beating edges has a beating radius in relation to the center axis. In one or some embodiments, the beater bars are designed in such a way that the circumferential circles of all beating edges of all beater bars have at least essentially the same beating radius.

If the crop is not yet separated by the threshing concave in the region of the threshing device, a remaining mixture of plant residues and detached crop may be transferred from the threshing device to an axial separating device immediately downstream, through which the remaining crop may be separated from the plant residues. For this purpose, the separating device may comprise at least two axial separating rotors, each of which may be mounted so that the separating rotors may be rotatably driven about an axis of rotation. Typically, the separating rotors extend parallel to each other and are arranged or positioned next to each other viewed in the longitudinal direction of the combine. To facilitate the transfer of the harvested material from the threshing device to the separating device, the separating device may include an infeed head at its end facing the threshing device, into which the harvested material may be transferred starting from the threshing device. The infeed head may have the function of feeding the flow of harvested material in an orderly manner to the separating rotors.

At their ends facing the threshing device, the separating rotors generally each have at least one infeed vane which extends radially with respect to the axis of rotation of the particular separating rotor and is configured to grip harvested material transferred into a particular infeed region of the infeed head that is associated with the particular separating rotor and to set it in a rotational movement about the axis of rotation of the separating rotor. In the course of operation of the separating rotors, the harvested material is transported using a particular separating rotor in a spiral along its axis of rotation to a rear end of the separation device. In so doing, the desired separation of the crop from the plant residues takes place due to the mechanical action of the separating rotor on the mixture. The crop may be separated downward through a threshing concave of the separating basket onto a screening device.

After separating the mixture into plant residues and crop, the plant residues may finally be ejected at a rear end of the combine, while the crop is collected in a grain tank.

U.S. Pat. No. 5,454,758, incorporated by reference herein in its entirety, discloses a self-propelled combine harvester with an axial separating device and further discloses equalizing a torque load of the at least one separating rotor of the separating device.

US Patent Application Publication No. 2014/0194170 A1 and U.S. Pat. No. 8,231,447, both of which are incorporated by reference herein in their entirety, disclose threshing mechanisms.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
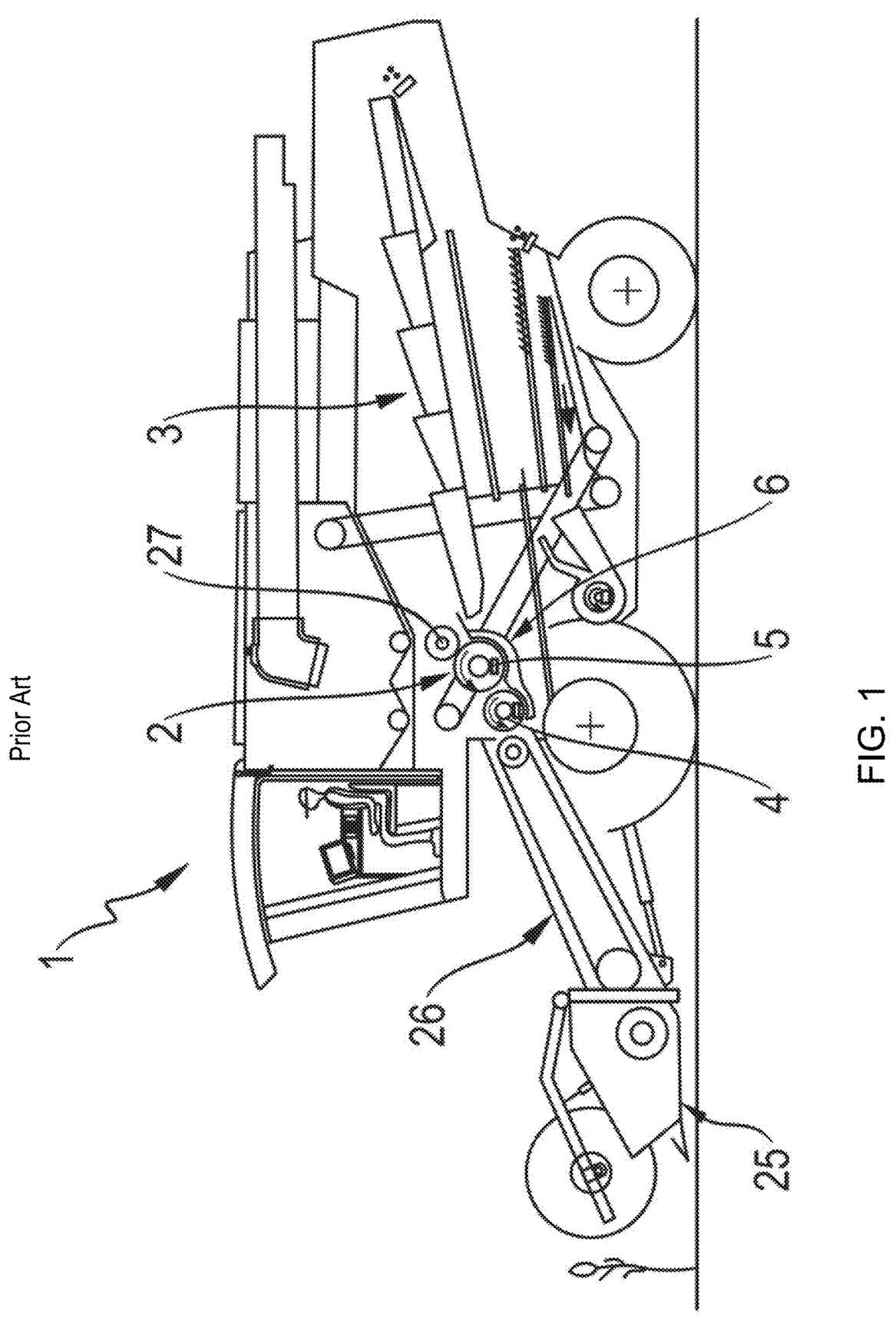
FIG. 1 illustrates a cross-section of a combine harvester.

As discussed in the background, threshing devices may be used on a combine harvester (interchangeably termed a combine) to process plants or crops. Particularly in constellations in which the harvested material is transferred to an axial separating device downstream from the threshing device, it may be important to distribute the flow of harvested material into several partial streams, such as one partial stream per separating rotor. This may be due to the fact that axial separating devices typically have a plurality, such as two, separating rotors arranged or positioned parallel to each other as well as next to each other, to which the harvested material taken by the threshing device must be distributed. In order to distribute the flow of harvested material to the separating rotors, the separating device may typically have an infeed head described above, which may be formed at an end of the separating device facing the threshing device. The infeed head may define a number of infeed areas (interchangeably termed intake areas) corresponding to a number of the separating rotors, wherein each respective infeed area may be associated with a respective one of the separating rotors. When the flow of harvested material is transferred from the threshing device to the separating device, the harvested material may be forcibly distributed to the infeed areas and in this way fed to the separating rotors.

In particular, in one constellation in which the harvested material is transferred directly from the threshing drum to the separating device, the flow of harvested material may be improved while being transferred from the threshing device to the separating device. This may especially be applied to the distribution of the flow of harvested material to the separate intake areas of the infeed head. During this distribution, undesirable compression of the harvested material or blockages may occur in an area, such as a central area, between the infeed areas.

Thus, in one or some embodiments, a threshing drum and a combine harvester are disclosed which contribute to or are designed to improve the flow of the harvested material while the flow is being transferred from the threshing device to the separating device.

In one or some embodiments, the threshing drum may include a cutting ring which, viewed in the longitudinal direction of the drum body, may be arranged or positioned centrally on the outer circumferential surface of the drum body and may be configured to rotate in the circumferential direction of the drum body. In other words, the cutting ring may extend annularly around the drum body within a plane oriented perpendicular to the center axis of the drum body.

In one or some embodiments, the cutting ring has at least one radially outer cutting edge running around the circumferential direction of the drum body. This may be designed in such a way that the cutting ring is suitable or configured to cut up plant material, which may be formed by plant residues. The cutting edge may run or operate in a cutting plane arranged or positioned perpendicular to the center axis of the drum body and may describe or define a circumferential circle whose cutting radius measured with respect to the center axis of the drum body is larger than the beating radii of the beating edges of the beater bars. In other words, the cutting edge of the cutting ring may project radially with respect to the drum body relative to the beating edges of the beating bars. In one or some embodiments, the cutting radius may be identical to the beating radii or only minimally larger than the beating radii. In the latter case (where the cutting radius is larger than the beating radii), the cutting radius may exceed the beating radius of a particular beating edge within a range between 1 mm and 3 mm, such as between 1.5 mm and 2 mm.

The threshing drum may have one or more advantages. In particular, the threshing drum may be suitable for separating the flow of harvested material centrally with respect to its center axis into a left-hand part and a right-hand part, in that plant material, which may be located in a central region of the threshing drum and may have to be guided to one of the two infeed regions while being transferred to the infeed head, may be cut or severed. Further, the part(s) of the plant material, which are assigned to the left-hand part of the drum body, as viewed in the longitudinal direction of the center axis, may be fed immediately or directly to the left-hand infeed region of the infeed head and conversely, the part(s) of the plant material, which are assigned to the right-hand part of the drum body may be fed immediately or directly to the right-hand infeed region of the infeed head. In particular, this may prevent plant material from getting caught on a central material flow divider of the infeed head, which may be designed in the form of a vertical (or vertically-oriented) dividing wall separating the two infeed areas from each other, and thereby impeding and disturbing the flow of the flow of harvested material. A design in which the cutting radius is larger than the beating radii may mean that the cutting engagement of the cutting ring with the harvested material actually occurs, and the harvested material is not prevented from engaging with the cutting ring because of the action(s) of the beater bars.

In one or some embodiments, the cutting ring is formed by a plurality of individual ring segments, wherein one ring segment may be inserted in each case into an intermediate space between two adjacent beater bars. The ring segments may be arranged or positioned together in a plane oriented perpendicular to the center axis of the drum body in such a way that they jointly form the cutting ring and jointly form the annular circumferential, in this case interrupted, cutting edge. Due to the arrangement of the individual ring segments between adjacent beater bars, the at least one cutting edge may be interrupted in intermediate areas between two adjacent ring segments. Consequently, in this embodiment, the cutting ring, like the cutting edge, need not be continuous, but may be interrupted, such as at equidistant intervals when viewed in the circumferential direction of the drum body. The advantage of this embodiment is that individual sections of the cutting ring need not be machined or removed for maintenance; instead, only individual segments may be removed and replaced in the event of damage. Likewise, such a design is contemplated as a retrofit solution for existing threshing drums, whereby the individual ring segments may be subsequently mounted on the drum body of such a threshing drum and then jointly form the cutting ring with the at least one circumferential cutting edge.

In one or some embodiments, the cutting ring comprises a plurality of cutting discs, such as exactly two cutting discs, which may be arranged or positioned next to each other viewed in the longitudinal direction of the drum body. In one or some embodiments, the cutting discs are arranged or positioned relative to each other in such a way that they are directly adjacent to each other. In one or some embodiments, the cutting discs each form their own cutting edge, so that in the described embodiment with several cutting discs, there are effectively several cutting edges through which the harvested material may be cut. Tests have shown that this may reduce the proportion of plant material that comes into contact with the cutting ring but is nevertheless not successfully cut. Consequently, the use of the plurality of cutting discs that each form their own cutting edge may improve reliability with regard to the cutting action of the cutting ring. Advantageously, the cutting radii of the circumferential circle describing cutting edges in relation to the center axis of the drum body may be of equal size.

Furthermore, such an embodiment may be advantageous in which at least one cutting disc is constructed in multiple layers in the manner of a sandwich, wherein a middle layer is formed by a harder material than edge layers connected to the middle layer on both sides thereof. In particular, the middle layer may be formed by a steel sheet with a stronger quality or rigidity and accordingly a greater hardness than the edge layers, which may be formed by steel sheets with a lesser quality and accordingly less hardness than the middle layer. In one or some embodiments, the edge layers may be designed in the same way. The described design may help to ensure that the edge layers wear more quickly than the middle layer, which may mean that the cutting ring remains sharp longer.

Furthermore, such an embodiment may be advantageous in that at least one cutting edge of the cutting ring, such as all cutting edges of the cutting ring, have a sawtooth contour or a wave contour. In this embodiment, the cutting action of the particular cutting edge may be additionally improved, whereby reliable cutting of plant material in the central region of the threshing drum is improved. The advantages resulting from this with regard to the flow of the flow of harvested material during the transfer to the infeed head with its separate infeed areas have already been explained above.

In one or some embodiments, a self-propelled combine harvester may use the disclosed threshing device. In particular, the combine harvester may comprise the tangential threshing device described herein and a tangential separating device. The separating device may comprise two axial separating rotors which, viewed in the longitudinal direction of the combine harvester, may be arranged or positioned next to one another and typically extend parallel to one another. The separating device may be connected downstream, such as immediately downstream, from the threshing device, so that harvested material processed using the threshing device may be transferred directly to the separating device beginning from the threshing device. In one or some embodiments, the harvested material may be transferred directly from the threshing drum to the separating device, wherein an additional turning drum or feed drum may be dispensed with or unnecessary when using this design.

Thus, in one or some embodiments, the combine harvester may use the threshing drum of the threshing device as disclosed herein. The resulting advantages, discussed above, may likewise apply to the use of the threshing device within the combine harvester. In particular, due to its cutting ring, the threshing drum may be suitable for cutting up plant material and thereby improving the transfer of the harvested material or the flow of harvested material during its transfer to the separating device. The cutting of plant material in the central area of the threshing drum may result in a clear or more defined assignment of harvested material to a left side and a right side of the threshing drum, which may correspond to the axial separating rotors arranged or positioned next to each other, so that the harvested material that is assigned to the left side of the threshing drum may be transferred to one separating rotor, and the harvested material that is assigned to the right side of the threshing drum may be transferred to the other separating rotor.

In one or some embodiments, the separating device has an infeed head at an end facing the threshing device, into which the flow of harvested material coming from the threshing device may be transferred and fed in an orderly or predefined manner to the separating rotors. For this purpose, the infeed head may have a number of infeed areas corresponding to the number of separating rotors, one of which may be assigned to each of the separating rotors. The two infeed areas may advantageously be spatially separated from one another at an end of the infeed head facing the threshing device using a material flow divider. The material flow divider may be formed by a vertical dividing wall, through which the flow of harvested material may be distributed to the infeed areas. The orderly feed of the flow of harvested material including the distribution of the same to the two separating rotors using the described infeed head has proven to be advantageous in processing the flow of harvested material without disturbances. In particular, a "wrapping" of the material flow divider, in which plant residues get caught on the material flow divider and disrupt the flow of harvested material, may be substantially avoided.

The described infeed head has also proven to be particularly advantageous if the threshing drum is positioned relative to the infeed head in such a way that the at least one cutting edge of the cutting ring is spatially assigned to the material flow divider between the two infeed areas. This may have the effect that the plant material is cut by the action of the cutting ring exactly where, downstream from the threshing device, the flow of harvested material is subsequently distributed using the material flow divider to the left and right infeed areas of the infeed head. This may largely prevent plant material from getting caught on the material flow divider, which may contribute to a noticeable disturbance in the flow of harvested material.

Furthermore, it may be particularly advantageous if the at least one cutting edge of the cutting ring is arranged or positioned at a predetermined distance of at most 20 mm, such as at most 10 mm, or such as at most 5 mm, in front of the infeed head. In other words, the threshing drum may be positioned at no more than a predefined distance relative to the infeed head in such a way that the circumferential circle of the at least one cutting edge is positioned at the described distance from the infeed head, which distance (in one embodiment) should be as small as possible so that, while maintaining a manufacturing tolerance, a collision of the cutting edge with the infeed head is still excluded. In view of the above explanation, it may further be advantageous if the circumferential circle of the at least one cutting edge is associated with the material flow divider of the infeed head at a seam location at which a distance between the circumferential circle and the infeed head is minimal. The arrangement or positioning of the cutting ring or its cutting edge in the immediate vicinity of the infeed head may have the advantage that any plant material that has not been subject to the cutting action of the cutting ring cannot pass downstream from the threshing drum in the region of the material flow divider between the infeed regions and lead there, despite the presence of the cutting ring, to the described disturbance as a result of being unintentionally caught by the material flow divider.

In one or some embodiments, the threshing concave may comprise a material guide, which may be assigned to the material flow divider and may encompass it in one or more areas. In this embodiment, the material guide may be movable as part of the threshing concave together with the rest of the threshing concave relative to the threshing drum, wherein a distance between the threshing concave and the threshing drum may be changed as a result of a movement of the concave. This may change the thickness of a threshing gap extending between the threshing concave and the threshing drum, whereby the harvesting output may be improved depending on external boundary conditions. The material guide may help to ensure that the harvested material transferred from the threshing device to the separating device is reliably distributed to the left and right infeed areas of the infeed head, independent of a position of the threshing concave relative to the threshing drum. This may be due to the material guide, as part of the threshing concave, being guided along the material flow divider during a movement of at least one last concave segment of the threshing concave associated with the separating device and consequently not changing its position relative to the rest of the threshing concave. Consequently, the guiding effect of the material guide on the flow of harvested material may be independent of the setting of the threshing gap between the threshing drum and the threshing concave.

In order to guide the material guide as close as possible to the material flow divider, it may also be particularly advantageous if the crop guide comprises a groove in a side facing away from the rest or the remainder of the threshing concave, in which the material flow divider is guided. In this embodiment, the material flow divider may be grasped by the material guide using this groove, wherein the material flow divider may be guided between side walls of the groove and therefore inside the groove.

Furthermore, such an embodiment of the combine harvester may be particularly advantageous in which at least one concave segment of the threshing concave is arranged or positioned flush in front of an end of the infeed head facing the threshing device. Due to this design, a transition of the flow of harvested material from the threshing concave to the infeed head may be possible without obstacles, which may improve the flow of harvested material.

Referring to the figures, a threshing drum 5 according to one aspect of the invention, is illustrated in FIGS. 4 to 7. The threshing drum may be provided on and for use with a combine harvester 1, through which plants may be picked up or collected from a field and processed. FIG. 1 illustrates an example combine harvester 1. Further, example combine harvesters are disclosed in US Patent Application Publication No. 2020/0305352 A1 and US Patent Application Publication No. 20230172105 A1, incorporated by reference herein in their entirety. Combine harvester 1 comprises a cutting unit 25, through which plants may be cut, which in turn may then be fed using an inclined conveyor 26 to a tangential threshing device 2. The threshing device 2 comprises a front drum 4, a threshing drum 5 and a turning drum 27. In one or some embodiments, central axes of the drums are aligned transversely to a longitudinal direction of the combine harvester 1. The threshing device 2 may be controlled using a control unit, which may comprise at least one processor and at least one memory. Furthermore, the threshing device 2 comprises a threshing concave 6, which may surround at least one or more parts of the front drum 4 and the threshing drum 5 in one or more regions. The processing of the harvested material using the threshing device 2 results in crop being detached from the plants and the plants being separated in this way into the crop and remaining plant residues. A large part of the crop may be discharged directly in the area of the threshing device 2 using the threshing concave 6 downwardly onto a feed floor. For the rest, a mixture of plant residues and detached crop is transferred using the turning drum 27 to a downstream separating device 3. In the example shown in FIG. 1, this is formed by a straw walker. The separating device 3 may be configured to separate the remaining crop from the plant residues so that they may be recovered separately. The plant residues may be finally ejected from the combine harvester 1 at a rear end thereof. The crop, on the other hand, may be collected in a grain tank and stored until further removal.

Figure 2:
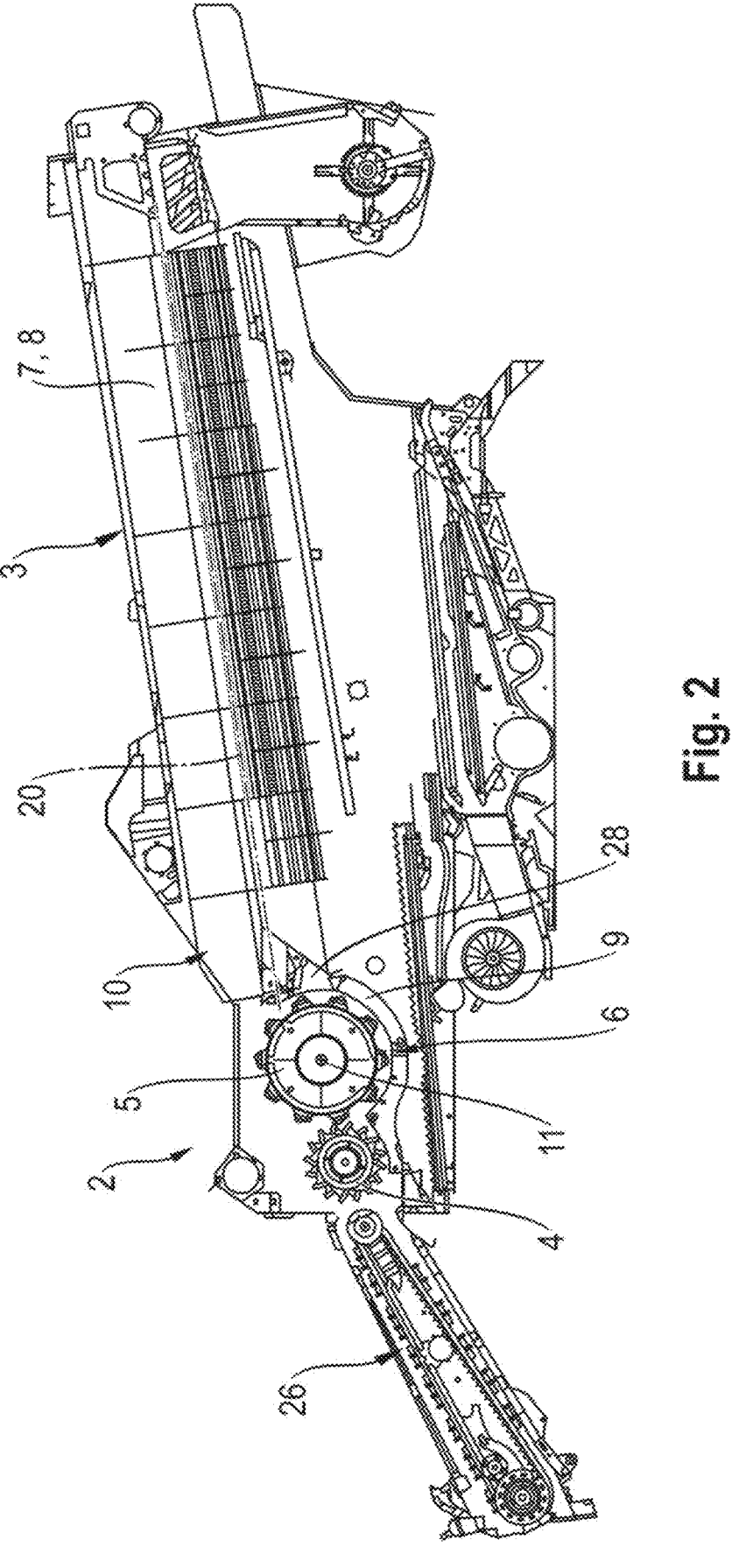
FIG. 2 illustrates a cross-section of a power train of the combine harvester.

As an alternative to a separating device 3 designed as a straw walker, an axial separating device 3 may also be used and which has at least one separating rotor 7, 8. FIG. 2 illustrates an axial separating device 3 that has two separating rotors 7, 8, which may be arranged or positioned parallel to one another and next to one another viewed in the longitudinal direction of the combine harvester 1. The separating rotors 7, 8 may each be mounted so as to be rotationally drivable about an axis of rotation 20. In the example depicted, the separating device 3 comprises an infeed head 10 facing the threshing device 2, into which the harvested material is transferred proceeding from the threshing device 2. For this purpose, the infeed head 10 comprises two infeed areas 29, one of which is assigned to each of the separating rotors 7, 8. The infeed areas 29 are structurally separated from one another using a material flow divider 28 so that harvested material, which is transferred from the threshing device 2 to the separating device 3, is divided between the two infeed areas 29 using the material flow divider 28. The material flow divider 28 may be formed here by a vertical dividing wall which separates the two infeed areas 29 from one another. FIG. 2 further illustrates that the threshing device 2 is designed without the turning drum 27 shown in FIG. 1 or another feed drum, so that the harvested material is transferred directly from the threshing drum 5 to the separating device 3.

Figure 3:
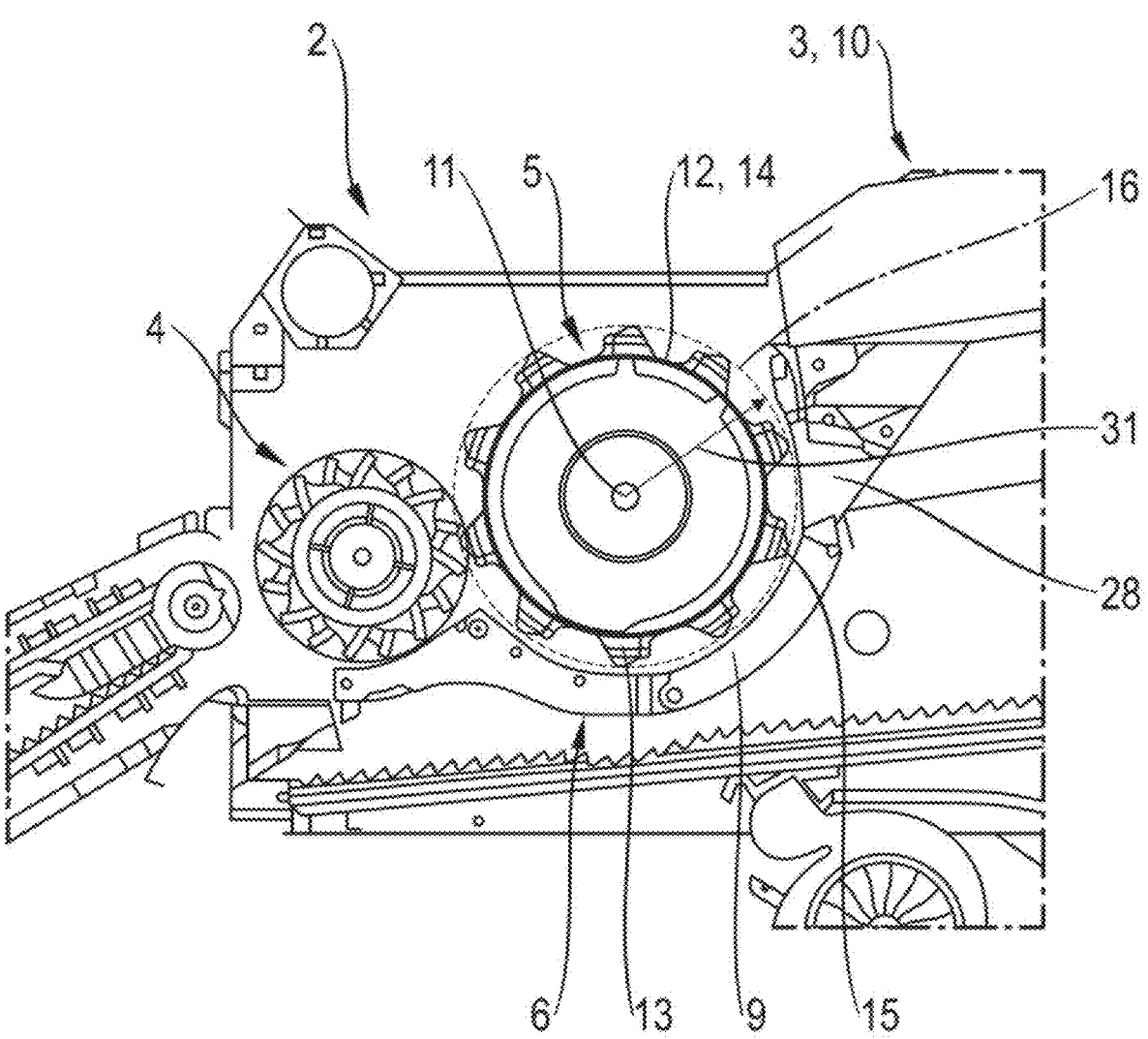
FIG. 3 illustrates details of a threshing device of the powertrain according to FIG. 2.

The threshing drum 5 may extend longitudinally along a center axis 11 of a drum body 12 and may comprise a plurality of beater bars 13. This is illustrated in FIG. 3. The plurality of beater bars 13 are arranged or positioned on an outer circumferential surface 14 of the drum body 12 of the threshing drum 5, wherein the beater bars 13 project radially beyond the circumferential surface 14 with respect to the center axis 11 of the drum body 12. The beater bars 13 may each comprise a beating edge 15, which may form a radially outer termination of a respective beater bar 13. As a result of a rotary drive of the threshing drum 5 about the center axis 11 during the operation of the particular combine harvester 1, the beater bars 13 may come into beating contact with the crop by their beating edges 15, which may cause the detachment of the crop from the plant residues. The beating edges 15, which may extend parallel to the center axis 11, move while the drum body 12 is rotatably driven on a circumferential circle 16, which is illustrated in FIG. 3 by a dashed line. The circumferential circle 16 extends with respect to the center axis 11 in a beating radius 31 about the center axis 11. In order to promote a flow of harvested material from the threshing device 2 to the separating device 3, the threshing concave 6 is arranged or positioned flush in front of an end of the infeed head 10 facing the threshing device 2. In the depicted example, the threshing concave 6 comprises a rear concave segment 9, which is arranged or positioned directly as well as flush in front of the infeed head 10.

Figure 4:
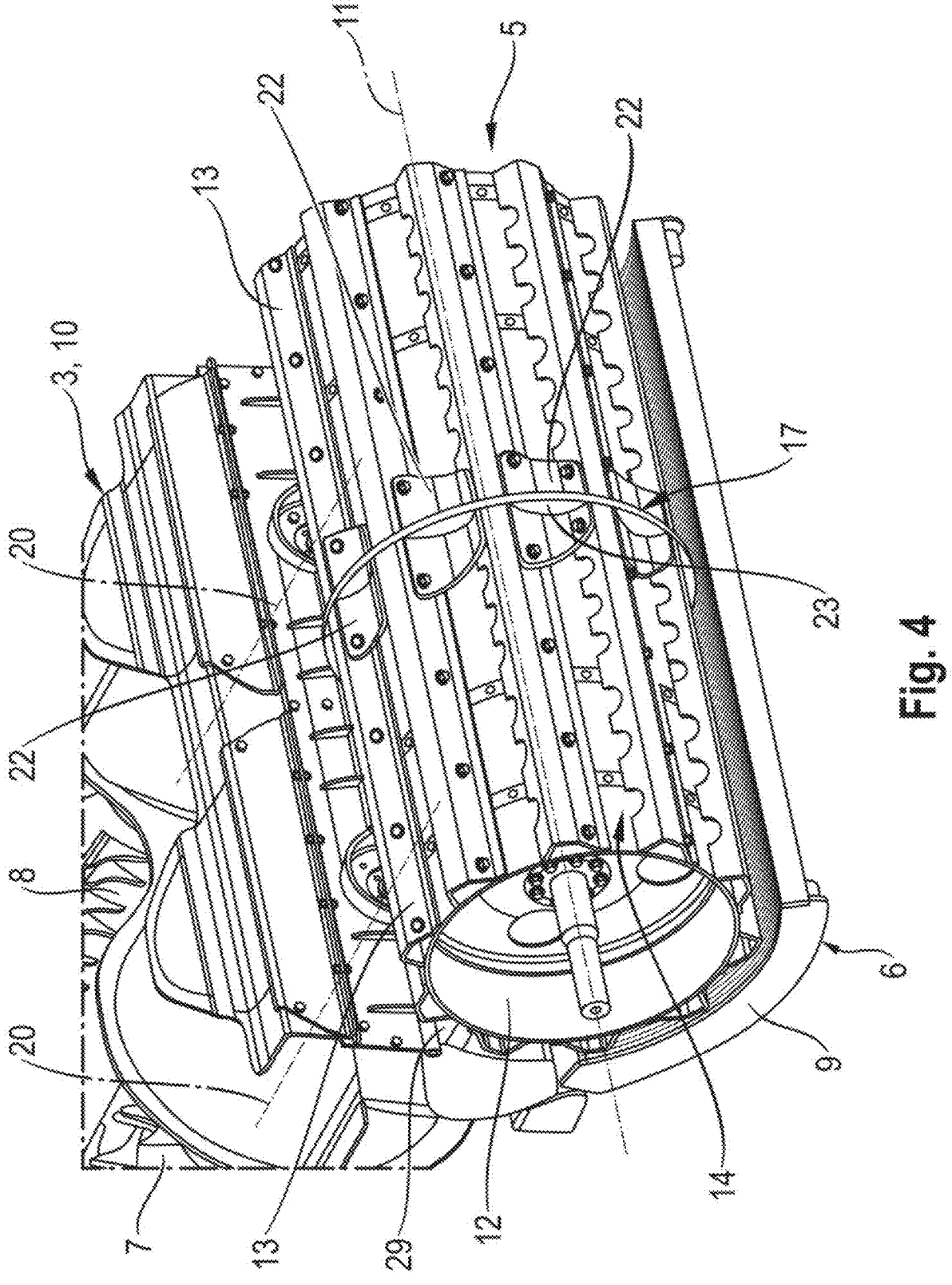
FIG. 4 illustrates a perspective view of a threshing drum according to one aspect of the invention in cooperation with an infeed head of a separating device.
Figure 5:
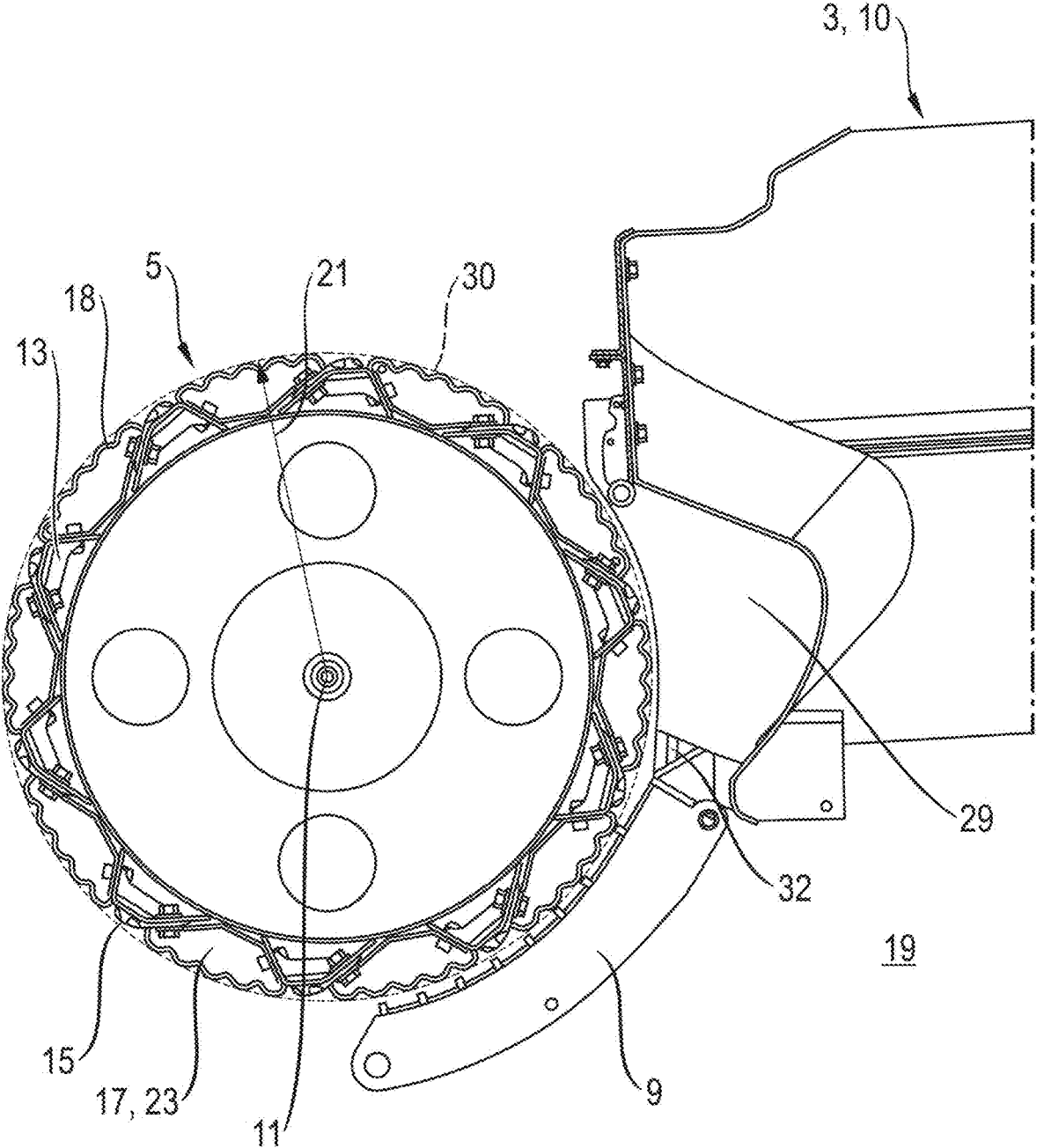
FIG. 5 illustrates a cross-section through the threshing drum according to FIG. 4.

In one or some embodiments, the threshing drum 5 is equipped with a cutting ring 17 which is arranged or positioned centrally on the drum body 12 with respect to the center axis 11 of the drum body 12 and extends in a plane oriented perpendicular to the center axis 11. This is depicted in FIG. 4. In the shown example, the cutting ring 17 comprises two cutting discs 23, which may be arranged or positioned directly adjacent to each other in pairs. In one or some embodiments, the cutting discs 23 are at least substantially identical in construction and each have a cutting edge 18 (e.g., a radially outer cutting edge), wherein the cutting edges 18 each extend in a cutting plane 19 oriented perpendicular to the center axis 11. In this case, the cutting ring 17 is designed in such a way that the cutting edges 18 of the cutting discs 23 are designed to run annularly around the center axis 11 in a circumferential circle 30 with respect to the center axis 11. In this case, a cutting radius 21 of the circumferential circle 30 is larger than the beating radius 31 of the beating edges 15. In other words, the cutting edges 18 project radially further beyond the outer circumferential surface 14 of the drum body 12 than the beating edges 15 with respect to the center axis 11. This may be further seen in FIG. 7. Further, in one or some embodiments, the cutting edges 18 of all cutting discs 23 may have an equal cutting radius 21.

In the shown example, the cutting ring 17 is segmented (e.g., formed by a plurality of individual ring segments 22). These ring segments 22 may each be arranged or positioned between two adjacent beater bars 13, as may be seen in FIG. 4. This design may lead to the cutting edges 18 not being continuous but being interrupted several times, such as frequently according to the number of beater bars 13. This is illustrated FIGS. 6 and 7. This may have the advantage that the beater bars 13 or their beating edges 15 do not have to be interrupted. In addition, the cutting ring 17, in the form of a plurality of ring segments 22, may be particularly advantageous for retrofitting an existing threshing drum 5 and thereby equipping it with a cutting ring 17.

Figure 6:
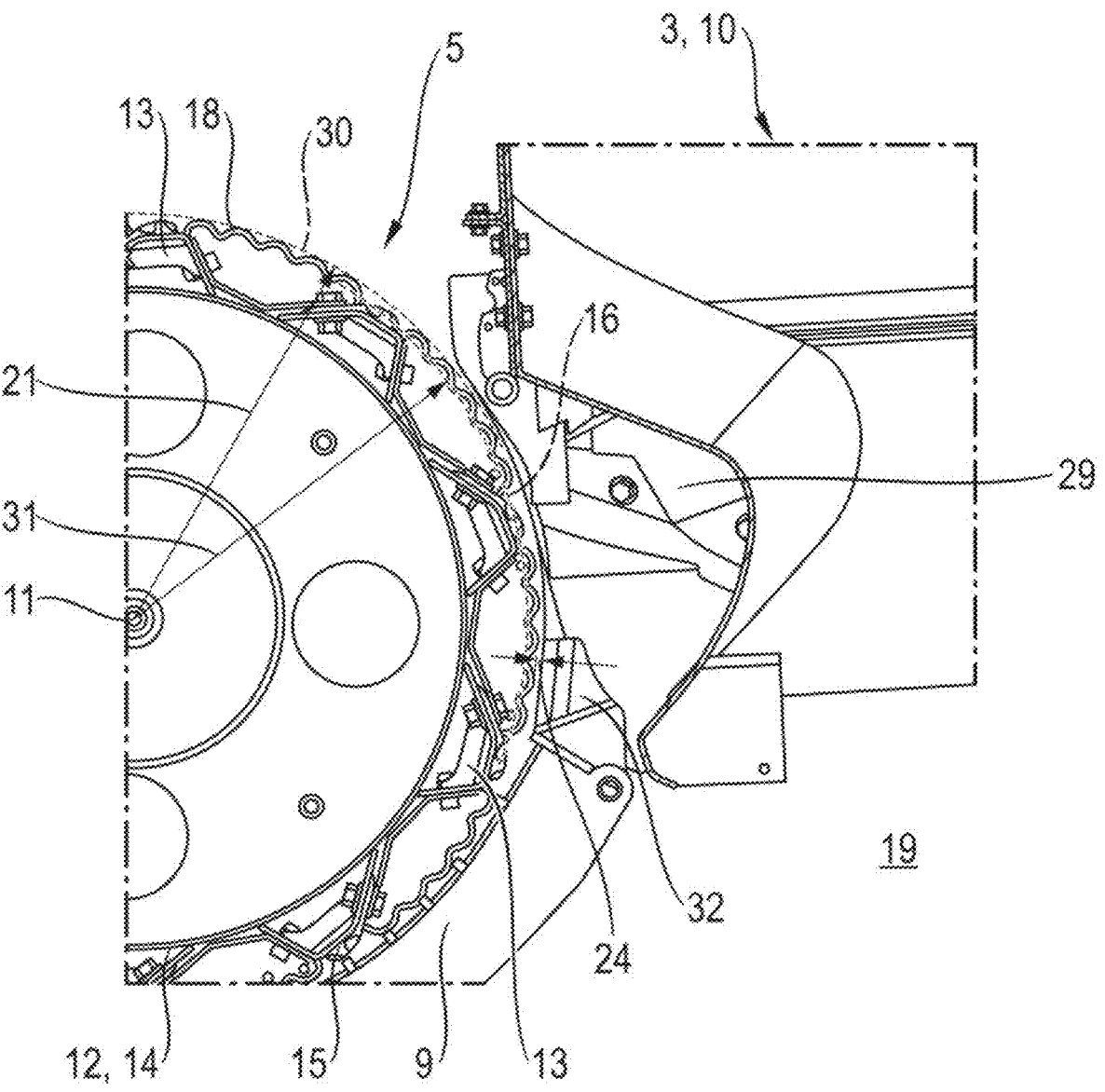
FIG. 6 illustrates details of a transition area between the threshing drum and the infeed head according to FIG. 4.

With respect to the separating device 3 or its infeed head 10, the cutting ring 17 may be arranged or positioned in such a way that it is located directly adjacent to the infeed head 10. This is illustrated in FIG. 6. In the shown example, the cutting ring 17 is also associated with the material flow divider 28 in a particularly advantageous manner, so that a cutting action of the cutting edges 18 on the harvested material occurs where it is required for the purpose of distributing the crop to the two infeed areas 29 of the infeed head 10. In particular, the plant material of the flow of harvested material may be cut in such a way that it may be cleanly distributed to the left and right infeed areas 29 using the material flow divider 28. In one or some embodiments, in the shown example, a distance 24 of the circumferential circle 30 of the cutting edges 18 to the material flow divider 28 is only about 5 mm.

Figure 7:
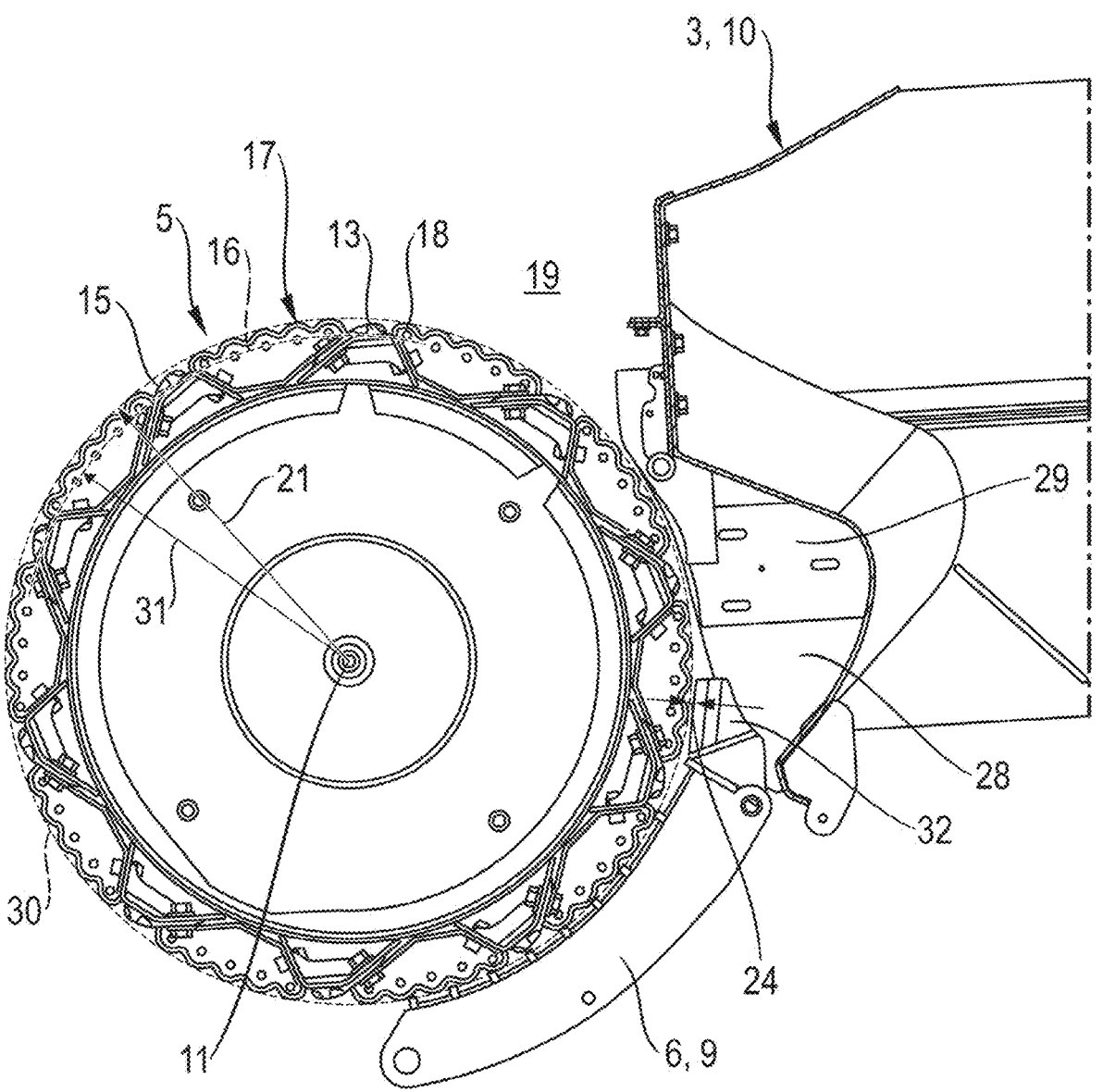
FIG. 7 illustrates other details of the transition area shown in FIG. 6.

To achieve a better cutting effect, the cutting edges 18 in the shown example are wave-shaped, such as depicted in FIG. 7.

Figure 8:
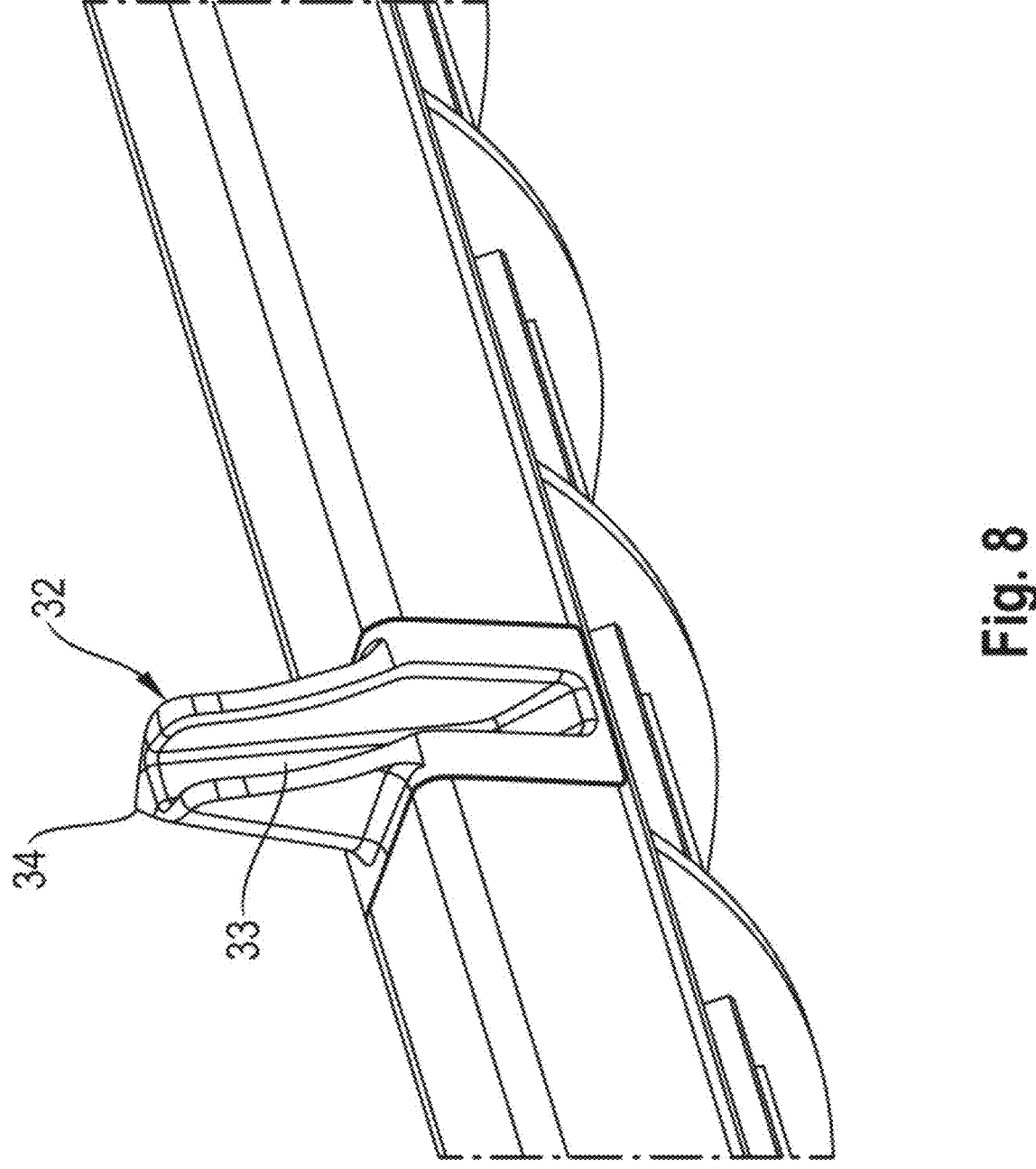
FIG. 8 illustrates a material guiding element of a threshing concave.

In order to further optimize the distribution of the flow of harvested material to the two infeed areas 29 of the infeed head 10, the threshing concave 6 may be equipped with a material guide 32 in the shown example. This may be assigned to the concave segment 9 of the threshing concave 6, wherein the material guide 32 is assigned to the material flow divider 28 in relation to the infeed head 10. The material guide 32 may be designed in such a way that it encompasses the material flow divider 28, which may be formed by a vertical dividing wall between the two infeed areas 29. For this purpose, the material guide 32 in the shown example comprises a rear groove 33 in which the material flow divider 28 is guided. During a movement of the threshing concave 6 or at least of the concave segment 9 relative to the threshing drum 5, the material guide 32 may accordingly be moved since it is firmly connected to the remaining threshing concave 6 and is part of the threshing concave. Here, the material guide 32 may be guided along the material flow divider 28 using its groove 33 in such a way that the material flow divider 28 is continuously arranged or positioned in the groove 33. This may have the advantage that the distributing effect of the material guide 32 exists independent of a position of the threshing concave 6 relative to the threshing drum 5, which may, in turn, improve the distribution of the flow of harvested material to the infeed areas 29 of the infeed head 10. For this purpose, the material guide 32 may be wedge-shaped at its end facing the threshing drum 5, wherein the material guide 32 tapers to a pointed edge 34 in the direction of the threshing device 2. This is illustrated in FIG. 8.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Combine harvester
2 Threshing device
3 Separating device
4 Front drum
5 Threshing drum
6 Threshing concave
7 Separating rotor
8 Separating rotor
9 concave segment
10 Infeed head
11 Center axis
12 Drum body
13 Beater bar
14 Circumferential surface
15 Beating edge
16 Circumferential circle
17 Cutting ring
18 Cutting edge
19 Cutting plane
20 Axis of rotation
21 Cutting radius
22 Ring segment 23 Cutting disc
24 Distance
25 Cutting unit
26 Inclined conveyor
27 Turning drum
28 Material flow divider
29 Infeed area
30 Circumferential circle
31 Beating radius
32 Material guide
33 Groove
34 Edge

The invention claimed is:

1. A threshing drum for a threshing device of a combine harvester, the threshing drum comprising:
a cylindrical drum body configured to be rotatably driven about a center axis;
a plurality of beater bars that are positioned on an outer circumferential surface of the cylindrical drum body, wherein the plurality of beater bars each have a beating edge oriented parallel to the center axis of the cylindrical drum body, wherein one or more of the plurality of beater bars project in a radial direction with respect to the center axis of the cylindrical drum body in a direction away from the center axis beyond the outer circumferential surface of the cylindrical drum body and define a circumferential circle around the center axis at a radially outer beating edge on which a respective beating edge rotates in a beating radius about the center axis during an operation of the threshing drum; and
a cutting ring positioned centrally on the outer circumferential surface of the cylindrical drum body when viewed in a longitudinal direction of the cylindrical drum body and configured to rotate in a circumferential direction of the cylindrical drum body, wherein the cutting ring has at least one radially outer cutting edge moving around in the circumferential direction of the drum body, wherein the at least one radially outer cutting edge extends in a cutting plane positioned perpendicular to the center axis of the drum body and defines a circumferential circle, wherein a cutting radius of which, measured with respect to the center axis, is larger than beating radii of the beating edges of the plurality of beater bars.

2. The threshing drum of claim 1, wherein the cutting ring is formed by a plurality of individual ring segments which are inserted into intermediate spaces between at least two beater bars so that the at least one radially outer cutting edge is interrupted in intermediate areas between two adjacent ring segments.

3. The threshing drum of claim 1, wherein the cutting ring comprises a plurality of cutting discs; and
wherein the plurality of cutting discs are positioned adjacent to each other viewed in the longitudinal direction of the drum body.

4. The threshing drum of claim 3, wherein the plurality of cutting discs comprise two cutting discs; and
wherein the plurality of cutting discs are positioned directly adjacent to each other.

5. The threshing drum of claim 4, wherein the plurality of cutting discs each have a cutting edge; and
wherein the cutting edges of each of the plurality of cutting discs have an equal cutting radius.

6. The threshing drum of claim 1, wherein at least one cutting edge have a sawtooth contour or a wave contour and wherein each of the at least one radially outer cutting edges have the sawtooth contour or the wave contour.

7. The threshing drum of claim 1, wherein the plurality of beater bars extend over an entire length of the cylindrical drum body.

8. The threshing drum of claim 2, wherein the cutting ring is interrupted at equidistant intervals when viewed in the circumferential direction of the drum body.

9. A self-propelled combine harvester comprising:
a threshing device, wherein the threshing device includes a front drum, a threshing drum downstream from the front drum in a direction of flow of harvested material, and a threshing concave at least partly surrounding both the front drum and the threshing drum; and
an axial separating device, wherein the separating device, viewed in a direction of flow of harvested material, is immediately downstream from the threshing device and comprises two axial separating rotors;
wherein the threshing drum comprises:
a cylindrical drum body configured to be rotatably driven about a center axis;
a plurality of beater bars that are positioned on an outer circumferential surface of the cylindrical drum body, wherein the plurality of beater bars each have a beating edge oriented parallel to the center axis of the cylindrical drum body, wherein one or more of the plurality of beater bars project in a radial direction with respect to the center axis of the cylindrical drum body in a direction away from the center axis beyond the outer circumferential surface of the cylindrical drum body and define a circumferential circle around the center axis at a radially outer beating edge on which a respective beating edge rotates in a beating radius about the center axis during an operation of the threshing drum; and
a cutting ring positioned centrally on the outer circumferential surface of the cylindrical drum body when viewed in a longitudinal direction of the cylindrical drum body and configured to rotate in a circumferential direction of the cylindrical drum body, wherein the cutting ring has at least one radially outer cutting edge moving around in the circumferential direction of the drum body, wherein the at least one radially outer cutting edge extends in a cutting plane positioned perpendicular to the center axis of the drum body and defines a circumferential circle, wherein a cutting radius of which, measured with respect to the center axis, is larger than beating radii of the beating edges of the plurality of beater bars.

10. The combine harvester of claim 9, wherein the axial separating device has, at an end facing the threshing device, an infeed head into which the flow of harvested material coming from the threshing device is transferred and fed to the two axial separating rotors.

11. The combine harvester of claim 10, wherein the threshing drum is positioned relative to the infeed head such that the at least one radially outer cutting edge of the cutting ring is positioned at a predetermined distance in front of the infeed head.

12. The combine harvester of claim 11, wherein the infeed head has, at the end facing the threshing device, a central material flow divider which comprises a vertically-oriented dividing wall and is configured to distribute the flow of harvested material transferred from the threshing drum to the infeed head to the two axial separating rotors.

13. The combine harvester of claim 12, wherein the threshing concave comprises a material guide which encompasses the central material flow divider in one or more areas; and wherein the material guide is guided along the central material flow divider during a movement of the threshing concave relative to the infeed head.

14. The combine harvester of claim 13, wherein the material guide comprises, on a side facing away from a remainder of the threshing concave, a groove in which the central material flow divider is guided so that the central material flow divider is continuously positioned in the groove in order for the material guide to distribute the harvested material independently of a position of the threshing concave relative to the threshing drum.

15. The combine harvester of claim 11, wherein the cutting ring is formed by a plurality of individual ring segments which are inserted into intermediate spaces between at least two beater bars so that the at least one radially outer cutting edge is interrupted in intermediate areas between two adjacent ring segments.

16. The combine harvester of claim 11, wherein the cutting ring comprises a plurality of cutting discs; and wherein the plurality of cutting discs are positioned adjacent to each other viewed in the longitudinal direction of the drum body.

17. The combine harvester of claim 16, wherein the plurality of cutting discs comprise two cutting discs; and wherein the plurality of cutting discs are positioned directly adjacent to each other.

18. The combine harvester of claim 17, wherein the plurality of cutting discs each have a cutting edge; and wherein the cutting edges of each of the plurality of cutting discs have an equal cutting radius.

19. The combine harvester of claim 10, wherein at least one concave segment of the threshing concave is positioned flush in front of the end of the infeed head facing the threshing device.

20. The combine harvester of claim 9, wherein the threshing drum is configured both to separate and feed material to the two axial separating rotors of the axial separating device.

* * * * *